United States Patent
Hazama et al.

(10) Patent No.: US 7,396,307 B2
(45) Date of Patent: Jul. 8, 2008

(54) MOTOR-INCORPORATED HYPOCYCLOID-TYPE SPEED REDUCER

(75) Inventors: Shinichiro Hazama, Toyota (JP); Akinori Hoshino, Nisshin (JP)

(73) Assignee: Aisin Seiki Kabushiki Kaisha, Aichi-Ken (JP)

(*) Notice: Subject to any disclaimer, the term of this patent is extended or adjusted under 35 U.S.C. 154(b) by 303 days.

(21) Appl. No.: 11/407,081

(22) Filed: Apr. 20, 2006

(65) Prior Publication Data
US 2006/0240932 A1    Oct. 26, 2006

(30) Foreign Application Priority Data
Apr. 22, 2005    (JP) ............................. 2005-125661

(51) Int. Cl.
*F16H 48/06* (2006.01)
(52) U.S. Cl. ....................................... 475/149
(58) Field of Classification Search ................ 475/149, 475/162, 177
See application file for complete search history.

(56) References Cited

U.S. PATENT DOCUMENTS

| 7,326,143 | B2* | 2/2008 | Kimura et al. | 475/162 |
| 2006/0189430 | A1* | 8/2006 | Hazama et al. | 475/162 |

FOREIGN PATENT DOCUMENTS

JP    2000-120810 A    4/2000

* cited by examiner

*Primary Examiner*—Dirk Wright
(74) *Attorney, Agent, or Firm*—Sughrue Mion, PLLC

(57) ABSTRACT

A motor-incorporated hypocycloid-type speed reducer includes: an eccentric portion configured to rotate in response to rotation of a rotor secured to a casing; an internal ring gear fixed to the casing and including a first internal gear coaxial with the rotor; an output shaft including a second internal gear coaxial with the rotor; an external gear including a first external gear and a second external gear and rotatably supported by the eccentric portion so as to rotate in an eccentric manner; a first sliding member held tight in the axial direction between one end surface of the output shaft and the end plate; and a second sliding member held tight in the axial direction between an other end surface of the output shaft and the supporting member.

18 Claims, 3 Drawing Sheets

MOTOR-INCORPORATED HYPOCYCLOID-TYPE SPEED REDUCER

CROSS REFERENCE TO RELATED APPLICATIONS

This application is based on and claims priority under 35 U.S.C. §119 with respect to Japanese Patent Application 2005-125661 filed on Apr. 22, 2005, the entire content of which is incorporated herein by reference.

FIELD OF THE INVENTION

This invention relates to a motor-incorporated hypocycloid-type speed reducer.

BACKGROUND

JP2000-120810 (See FIGS. 1 and 2) discloses a conventional motor-incorporated hypocycloid-type speed reducer, in which an eccentric portion (carrier), which rotates an external gear (a planetary gear) in an eccentric manner, is connected to a rotor, which is electrically rotated, in such a manner that a rotational force of the rotor can be transmitted. The rotor is fitted with, and is supported by, a bearing rod so as to freely rotate.

In the above-described motor-incorporated hypocycloid-type speed reducer, the external gear is supportedly mounted on a ball bearing, and an output shaft fixed with an internal gear is rotatably supported by a plain bearing formed at a central portion of a case. According to this type of structure, when the output shaft is subjected with a load applied in a radial direction, the external gear or the internal gear (the output shaft) may on occasions tilt or lean due to the ball bearing or a clearance between the plain bearing and the output shaft, which may lead to an occurrence of a noise. Such tilting or lean of the external gear, or, of the internal gear (the output shaft) can be prevented by increasing an axial length of the plain bearing axially supporting the output shaft. This, however, may result in an increase in an axial length of the hypocycloid-type speed reducer.

A need thus exists to provide to a motor-incorporated hypocycloid-type speed reducer, which can restrain an angle amount of tiling or lean of an output shaft.

SUMMARY OF THE INVENTION

According to an aspect of the present invention, a motor-incorporated hypocycloid-type speed reducer includes: a casing having a case and an end plate; a rotor rotatably supported by the casing and rotatable electrically; an eccentric portion configured to rotate in response to rotation of the rotor; an internal ring gear fixed to the casing and including a first internal gear which is coaxial with the rotor; an output shaft including a second internal gear which is coaxial with the rotor; an external gear including a first external gear and a second external gear which are coaxial with each other, the first external gear gear-meshed with the first internal gear and the second external gear gear-meshed with the second internal gear, and the external gear rotatably supported by the eccentric portion so as to rotate in an eccentric manner; a supporting member secured to the casing and the output shaft interposed between the supporting member and the end plate in an axial direction; a first sliding member held tight in the axial direction between one end surface of the output shaft and the end plate; and a second sliding member held tight in the axial direction between an other end surface of the output shaft and the supporting member. The output shaft is rotatably supported by the first sliding member and the second sliding member.

The first sliding member can be a rolling element and the second sliding member also can be a rolling element.

Alternatively or in addition, the first sliding member can be a ring coaxial with the rotor and the second sliding member can also be a ring coaxial with the rotor.

BRIEF DESCRIPTION OF THE DRAWINGS

The foregoing and additional features and characteristics of the present invention will become more apparent from the following detailed description considered with reference to the accompanying drawings, wherein.

DETAILED DESCRIPTION

Embodiments of the present invention will be described hereinbelow in detail with reference to the accompanying drawings.

First Embodiment

Figure 1A:
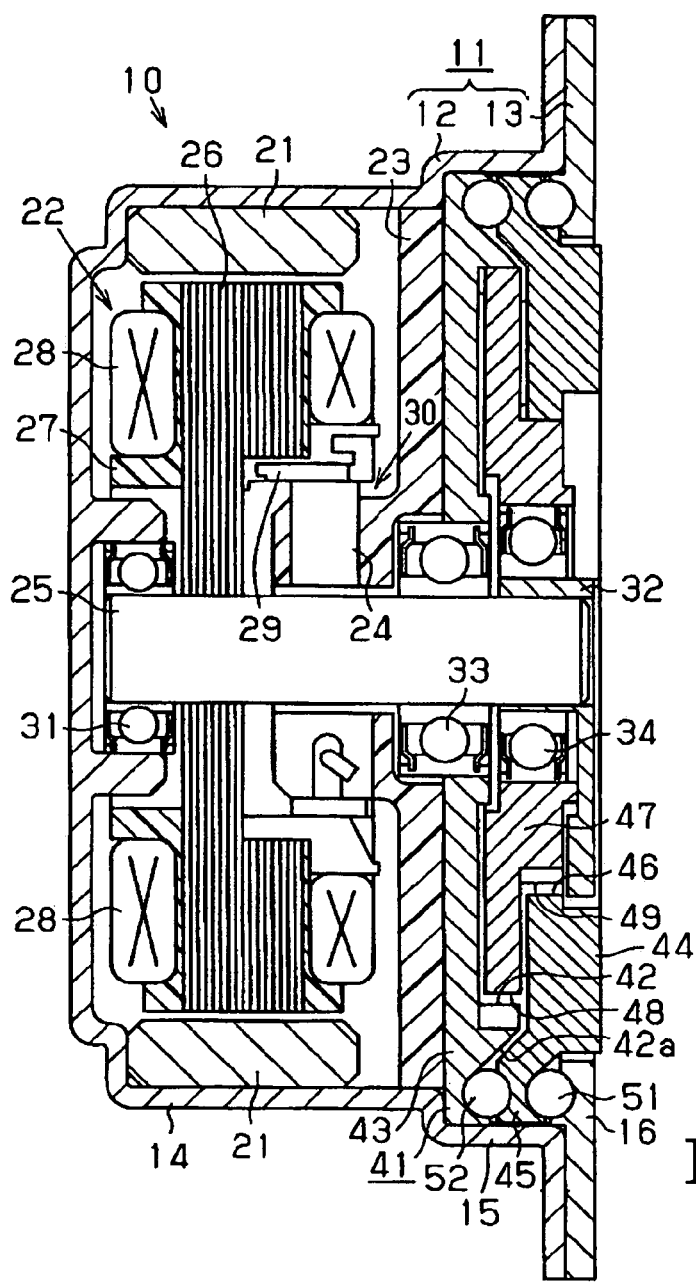
FIG. 1A is a cross sectional view of an actuator according to a first embodiment of the present invention.

As illustrated in FIG. 1A, an actuator 10 is configured with an electric motor and a hypocycloid-type speed reducer, which both are integrated inside a casing 11. The casing 11 includes a case 12 and an end plate 13. The case 12 includes; a first cylindrical portion 14 with a bottom: and a second cylindrical portion 15 which is formed following an opening end of the first cylindrical portion 14 and possess a larger diameter than a diameter of the first cylindrical portion 14. The end plate 13 possesses an inside flange 16, which extends along an inner periphery of the second cylindrical portion 15 and is substantially coaxial with the case 12 (i.e., the second cylindrical portion 15). The end plate 13 is fixedly attached to an opening end of the case 12, wherein a space, which is employed for example for housing components therein, is defined inside the casing 11.

The electric motor is configured with plural permanent magnets 21, which are fixedly attached to an inner peripheral surface of the case 12 (i.e., the first cylindrical portion 14), a rotor (an armature) 22, which is substantially coaxial with the case 12 and is axially rotatably supported by the case 12, and a brush 24, which is supported by a brush holder 23 fixed to an opening end of the first cylindrical portion 14.

The rotor 22 incorporates, therein, a shaft 25, of which one end is axially rotatably supported by a bearing 31 provided at a central portion of a bottom wall of the case 12 (the first cylindrical portion 14); a motor core 26, which is fixedly attached to the shaft 25 and faces internal surfaces of the permanent magnets 21, windings 28 which are coiled on the motor core 26 via an insulator 27; and a rectifier 29, which slidably comes in contact with the brush 24. A rectifying mechanism 30 is configured with the brush 24 and the rectifier 29. The windings 28 are connected to a power source, which is provided outside the actuator 10, via the rectifying mechanism 30.

An eccentric portion 32 is fixedly attached to the other end (the right in FIG. 1A) of the shaft 25, the eccentric portion 32 which possesses a substantially cylindrical shape and rotates integrally with the shaft 25. The eccentric portion 32 is a substantially cylindrical shaped-structure in which a wall thickness of a radially one side (an upper side in FIG. 1) is greater than the one of the radially other side (a down side in FIG. 1). The eccentric portion 32 can therefore be positioned and rotate in an eccentric manner relative to an axis of the shaft 25 (i.e., the rotor 22).

The second cylindrical portion 15 (i.e., the case 12) is secured with an internal ring gear 41 as a supporting member. The internal ring gear 41 is toothed at an inner surface thereof. The internal ring gear 41 is interposed between the brush holder 23 and the eccentric portion 32 in an axial direction. An outer diameter of the internal ring gear 41 is substantially equal to an inner diameter of the second cylindrical portion 15. The internal ring gear 41 is hence provided with or formed with a first internal gear 42 which is substantially coaxial with the shaft 25 (i.e., the rotor 22). The first internal gear 42 projects to an axially one side (the right side in FIG. 1) at a portion which is radially inwardly away at a predetermined distance from an outer peripheral surface of the internal ring gear 41. The first internal gear 42 possesses an inclined surface 42a, which can be a substantially cone-shaped structure which inclines from a radially outside towards a radially inside in accordance with an axial shifting towards the axially one side (the right side in FIG. 1). The internal ring gear 41 is further provided with or formed with an approximately annular-shaped peripheral portion 43 that is placed radially outside of the first internal gear 42 and faces the inside flange 16 of the end plate 13 along the axial direction.

The shaft 25 is axially rotatably supported by a bearing 33, which is positioned at a radially central portion of the internal ring gear 41 and near an axially other side (the left side in FIG. 1) of the eccentric portion 32. An output shaft 44 is supported between the inside flange 16 of the end plate 13 and the peripheral portion 43 of the internal ring gear 41 in such a manner that the output shaft 44 can rotate substantially coaxially with the rotor 22. More particularly, the output shaft 44 possess an approximately annular shaped structure, an outer diameter of which is smaller than an inner diameter of the inside flange 16. The output shaft 44 includes an extending portion 45 which extends radially outwardly from an outer periphery thereof along the inclined surface 42a exhibiting a substantially cone-shaped structure and is positioned between the inside flange 16 and the peripheral portion 43.

Figure 1B:
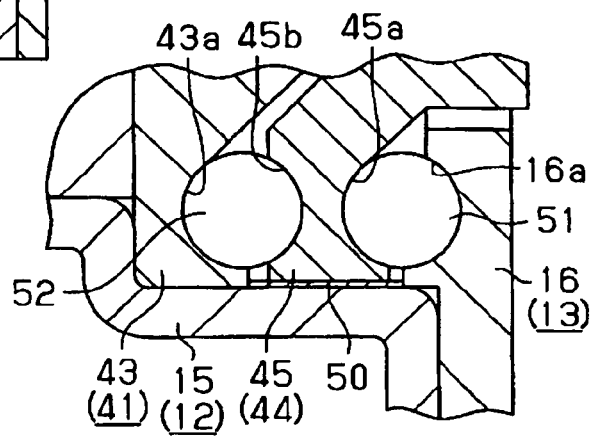
FIG. 1B is an enlarged view illustrating sliding members illustrated in FIG. 1A.

As is enlarged in FIG. 1B, an outer diameter of the extending portion 45 is smaller than the inner diameter of the second cylindrical portion 15. An approximately annular-shaped sliding member 50 is interposed between an outer peripheral surface of the extending portion 45 and the inner peripheral surface of the second cylindrical portion 15. Plural bearing surfaces 16a, which are recessed substantially spherically at the other end surface of the inside flange 16, are formed on the other end surface of the inside flange 16, while plural first bearing surfaces 45a, which are recessed substantially spherically at one end surface of the extending portion 45, are formed on the one end surface of the extending portion 45. The plural first bearing surfaces 45a face the plural bearing surfaces 16a in the axial direction, respectively. Plural bearing surfaces 43a, which are recessed substantially spherically at one end surface of the peripheral portion 43, are formed on the one end surface of the peripheral portion 43, while plural second bearing surfaces 45b, which are recessed substantially spherically at the other end surface of the extending portion 45, are formed on the other end surface of the extending portion 45. The plural second bearing surfaces 45b face the plural bearing surfaces 43a in the axial direction, respectively.

First balls 51, serving as first sliding members (rolling elements), are arranged so as to be held tight in the axial direction between the bearing surfaces 16a and the first bearing surfaces 45a. Second balls 52, serving as second sliding members (rolling elements), are arranged so as to be held tight in the axial direction between the bearing surfaces 43a and the second bearing surfaces 45b. According to the first embodiment of the present invention, the first balls 51 are placed at a radial distance from an axis of the output shaft 44, and the second balls 52 are placed at the same radial distance therefrom in the same radial direction.

When the first and second balls 51 and 52 rotates being applied with rotating friction, the output shaft 44 can be rotatably supported between the inside flange 16 and the peripheral portion 43.

The output shaft 44 further includes a second internal gear 46 which is substantially coaxial with the rotor 22. The second internal gear 46 is toothed at an inner surface thereof. An inner diameter of the second internal gear 46 is smaller than the inner diameter of the first internal gear 42. An external gear 47 is axially rotatably supported by the eccentric portion 32 via a bearing 34. The external gear 47 is toothed at an outer surface thereof. The external gear 47 is positioned in a space defined between the internal ring gear 41 and the output shaft 44, and is provided with a first external gear 48 and a second external gear 49 which both are substantially coaxial to each other. In view of the axial direction (the right-and-left direction in FIG. 1), the first external gear 48 is positioned at the side of the internal ring gear 41, while the second external gear 49 is positioned at the side of the output shaft 44. As described above, because the eccentric portion 32 rotates in an eccentric manner relative to the rotor 22, the center of the external gear 47, i.e., of the first and second external gears 48 and 49, rotates relative to the center of the rotor 22.

The first external gear 48 possesses an outer diameter, which is greater than an outer diameter of the second external gear 49 and smaller than the inner diameter of the first internal gear 42. The first external gear 48 is hence gear-meshed with the first internal gear 42. Meanwhile, the second external gear 49 possesses an outer diameter, which is smaller than an inner diameter of the second internal gear 46, and is hence gear-meshed with the second internal gear 46. For example, when an eccentricity or an eccentric distance of the external gear 47 relative to the eccentric portion 32 can be denoted with "e", a radius of the first internal gear 42 is set at a value which is a sum of a radius of the first external gear 48 with the eccentric distance "e". Likewise, a radius of the second internal gear 46 is set at a value which is a sum of a radius of the second external gear 49 with "e".

In the motor-incorporated hypocycloid-type speed reducer with the above-described configuration according to the first embodiment, once the electric motor is electrically energized, electric current at an amount corresponding to a rotational position is supplied to the coils 28 via the rectifying mechanism 30. In this case, according to the electric motor with the aforementioned structure, the motor core 26 is magnetized and is subjected with an attractive force, or a repulsive force, against the permanent magnets 21. The motor core 26 (i.e., the rotor 22) continuously rotates by virtue of the rectifying mechanism 30, and the rotor 22 electrically rotates about the shaft 25. In such circumstances, the planetary gear 47, which is axially rotatably supported by the eccentric portion 32, rotates in an eccentric manner. Further, because the first external gear 48 of the planetary gear 47 is gear-meshed with the first internal gear 42 of the internal ring gear 41 that is secured to the case 12, the planetary gear 47 rotates about its axis while rotating in an eccentric manner. Accordingly, the planetary gear 47 depicts a hypocycloid curve. Likewise, the second external gear 49 of the planetary gear 47 also depicts a hypocycloid curve. The second external gear 49 is gear-meshed with the second internal gear 46. Because the output shaft 44 is substantially coaxial with the rotor 22 and is rotatably supported between the inside flange 16 of the end plate 13 and the peripheral portion 43 of the internal ring gear 41, the output shaft 44 rotates in response to rotation of the second external gear 49. Because the inner diameter of the second internal gear 46 is smaller than the inner diameter of the first internal gear 42, the output, i.e., the rotational speed, of the output shaft 44 is decelerated relative to the rotational speed of the rotor 22 and is outputted.

As described above, at least the following effects can be obtained according to the first embodiment of the present invention.

(1) According to the first embodiment of the present invention, the output shaft 44 is rotatably supported at two portions, which are distant from each other in the axial direction, by the first balls 51 and the second balls 52. The first balls 51 are axially interposed between the one end surface of the output shaft 44 (the first bearing surfaces 45a) and the end plate 13 (the second bearing surfaces 16a). The second balls 52 are axially interposed between the other end surface of the output shaft 44 (the second bearing surfaces 45b) and the internal ring gear 41 (the bearing surfaces 43a). Therefore, even when a load is applied radially to the output shaft 44, the output shaft 44, which is stably supported, can be prevented from tilting, and an occurrence of noise due to this tilting can be restrained. Moreover, because the first and second balls 51 and 52 restrain an axial movement of the output shaft 44, for example a thrust bearing is not necessarily required additionally.

(2) According to the first embodiment of the present invention, the internal ring gear 41 can be employed not only as a ring gear of the external gear 47 but also as the supporting member associated with supporting the output shaft 44. Therefore, it is possible to reduce the number of components, which may leads to a downsizing of the motor-incorporated speed reducer.

(3) According to the first embodiment of the present invention, by making the most use of a space of the peripheral portion 43 of the internal ring gear 41, the internal space which does not interfere with a gear-engaged portion between the external gear 47 and the internal ring gear 41 and a gear-engaged portion between the external gear 47 and the output shaft 44, the extending portion 45 is placed to face the peripheral portion 43 in the axial direction, and the output shaft 44 is supported by the first and second balls 51 and 52 at the extending portion 45. Therefore, an axial length of the motor-incorporated speed reducer can be reduced, for example because at least one portion of the gear-engaged portions can overlap in the axial direction with the first and second balls 51 and 52.

According to the first embodiment, the plural first balls 51 and the plural second balls 52 are provided. However, at least one first ball 51 and at least one second ball 52 can be provided between the one end surface of the output shaft 44 (at least one first bearing surface 45a) and the end plate 13 (at least one second bearing surface 16a) and between the other end surface of the output shaft 44 (at least one second bearing surface 45b) and the internal ring gear 41 (at least one bearing surface 43a). In such circumstances, the same effects can be yielded.

Second Embodiment

Described below is a structure of an actuator 60 according to a second embodiment of the present invention. The actuator 60 is different from the actuator 10 according to the first embodiment, in the respect that two rings, which are substantially coaxial with the rotor 22, are employed as the first and second sliding members, in substitution for the first balls 51 and the second balls 52. The same components according to the first embodiment are denoted with the same reference numerals, and description thereof will be omitted herein.

Figure 2A:
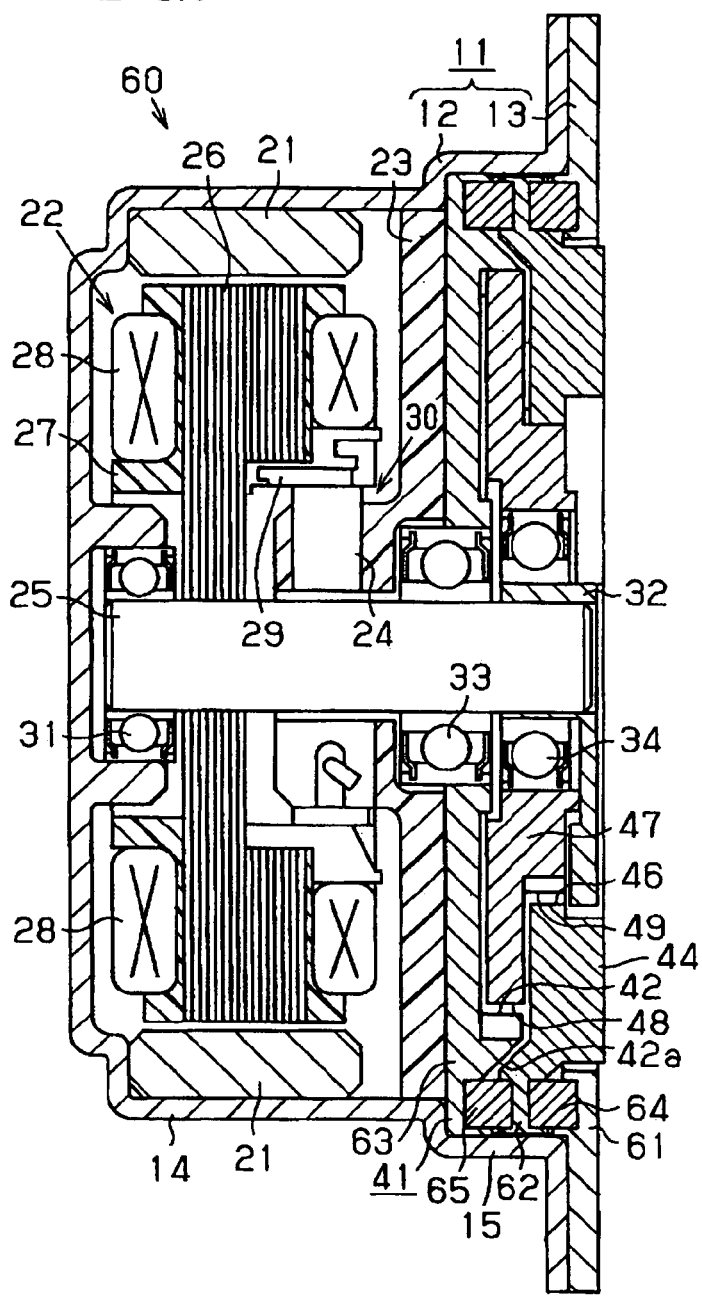
FIG. 2A is a cross sectional view of an actuator according to a second embodiment of the present invention.
Figure 2B:
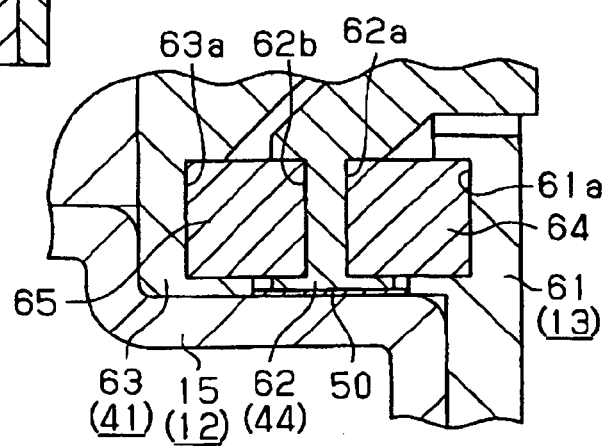
FIG. 2B is an enlarged view illustrating sliding members illustrated in FIG. 2A.

As illustrated in FIG. 2A, an approximately annular-shaped fitting groove 61a, which is substantially coaxial with the rotor 22, is recessed at an inside flange 61 of the end plate 13. An approximately annular-shaped first guide groove 62a is recessed at a one end surface of an extending portion 62 of the output shaft 44 so as to face the fitting groove 61a in the axial direction. An approximately annular-shaped fitting groove 63a, which is substantially coaxial with the rotor 22, is recessed at a peripheral portion 63 of the internal ring gear 41. An approximately annular-shaped second guide groove 62b is recessed at the other end surface of the extending portion 62 of the output shaft 44 so as to face the fitting groove 63a in the axial direction.

A first ring 64, serving as the first sliding member, is provided between the fitting groove 61a and the first guide groove 62a so as to be held tight in the axial direction therebetween. A second ring 65, serving as the second sliding member, is provided between the fitting groove 63a and the second guide groove 62b so as to be held tight in the axial direction therebetween. The first and second rings 64 and 65 are substantially coaxial with the rotor 22. The first ring 64 is fixedly fitted in to the fitting groove 61a and is rotatably supported by the first guide groove 62a. The second ring 65 is fixedly fitted into the fitting groove 63a and is rotatably supported by the second guide groove 62b. According to the second embodiment of the present invention, the first ring 64 is placed at a radial distance from an axis of the output shaft 44, and the second ring 65 is placed at the same radial distance therefrom in the same radial direction. When the first and second guide grooves 62a and 62b slidably move on the first and second rings 64 and 65, the output shaft 44 can be rotatably supported by the inside flange 61 and the peripheral portion 63.

As described above, according to the second embodiment, the same effects as the first embodiment can be yielded.

The above-described embodiments can be modified as follows.

Figure 3:
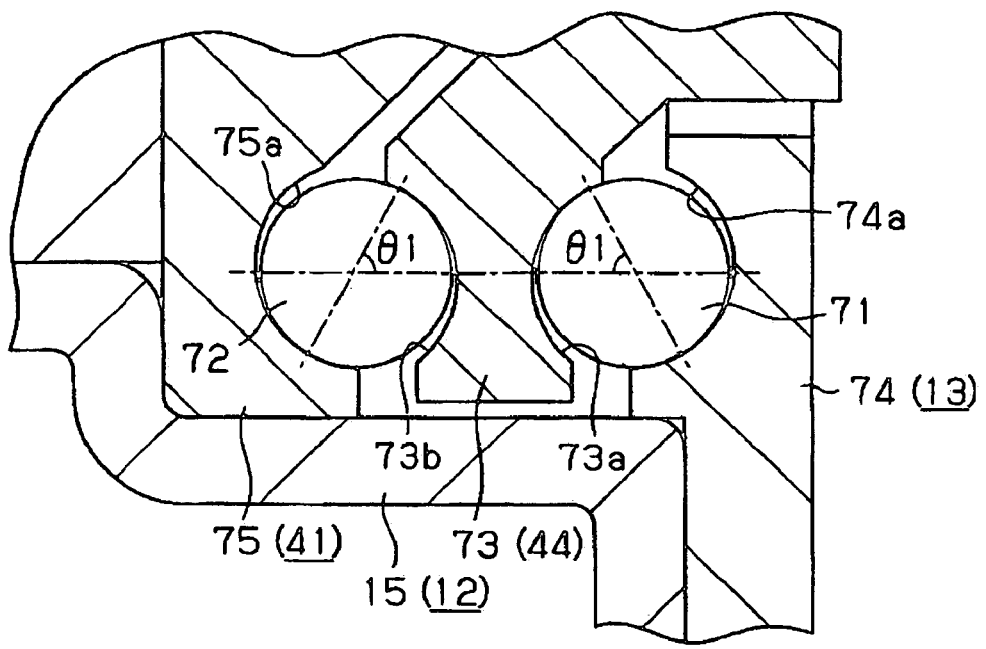
FIG. 3 is a modified example of the sliding members illustrated in FIG. 1A.

As illustrated in FIG. 3, in association with the first embodiment, first balls 71 (the first sliding members) are positioned between one end surface of an extending portion 73 of the output shaft 44 and an inside flange 74 of the end plate 13, and second balls 72 (the second sliding members) are positioned between the other end surface of the extending portion 73 and a peripheral portion 75 of the internal ring gear 41. The respective first balls 71 can establish an angular structure at a contact angle θ1 defined relative to the axial direction. Likewise, the respective second balls 72 can establish an angular structure at a contact angle θ1 relative to the axial direction. As for both the first balls 71 and the second balls 72, the contact angle θ1 is defined between a horizontal axis of each ball and a line of action against each ball. More specifically, plural bearing surfaces 74a are recessed substantially spherically at the inside flange 74, and plural first bearing surfaces 73a are recessed substantially spherically at the one end surface of the extending portion 73. The plural first bearing surfaces 73a are positioned so as to face the plural bearing surfaces 74a, respectively. Plural bearing surfaces 75a are recessed substantially spherically at the peripheral portion 75, and plural second bearing surfaces 73b are recessed substantially spherically at the other end surface of the extending portion 73. The second bearing surfaces 73b are positioned so as to face the plural bearing surfaces 75a, respectively. Moreover, a central point, of each first bearing surface 73a, and of each second bearing surface 73b is deviated outwardly radially relative to a central point of each bearing surface 74a, and of each bearing surface 75a.

The first balls 71 are positioned so as to be held tight in the axial direction between the bearing surfaces 74a and the first bearing surfaces 73a, respectively. The second balls 72 are positioned so as to be held tight in the axial direction between the bearing surface 75a and the second bearing surfaces 73b. In this case, the first balls 71 are placed at a radial distance from an axis of the output shaft 44, and the second balls 72 are placed at the same radial distance therefrom in the same radial direction. An outer diameter of each first ball 71 is smaller than an inner diameter, of each bearing surface 74a and each first bearing surface 73a, and an outer diameter of each second ball 72 is smaller than an inner diameter, of each bearing surface 75a and each second bearing surface 73b. Each first ball 71 possesses a contact angle $\theta1$ between a horizontal axis of each first ball 71 and a line of action from the one end surface (the first bearing surface 73a) of the extending portion 73 and is also defined between the horizontal axis and a line of action from the inside flange 74 (the bearing surface 74a). Each second ball 72 possesses a contact angle $\theta1$ between a horizontal axis of each second ball 72 and a line of action from the other end surface (the second bearing surface 73b) of the extending portion 73 and is also defined between the horizontal axis and a line of action from the peripheral portion 75 (the bearing surface 75a). In this case, the first and second balls 71 and 72 can absorb or can be subjected with radially applied load. Therefore, it is possible to further restrain an amount of tilting of the output shaft 44 relative to the radially applied load. Moreover, although the first and second balls 71 and 72 are supported so as to establish angular structures, they are held tight in the axial direction by the end plate 13 and the internal ring gear 41. Therefore, even if the first and second balls 71 and 72 are not applied with preload by a load applying means such as a wavy washer, centering of the first and second balls 71 and 72 can be achieved, and the structure thereof can be more simplified.

Figure 4:
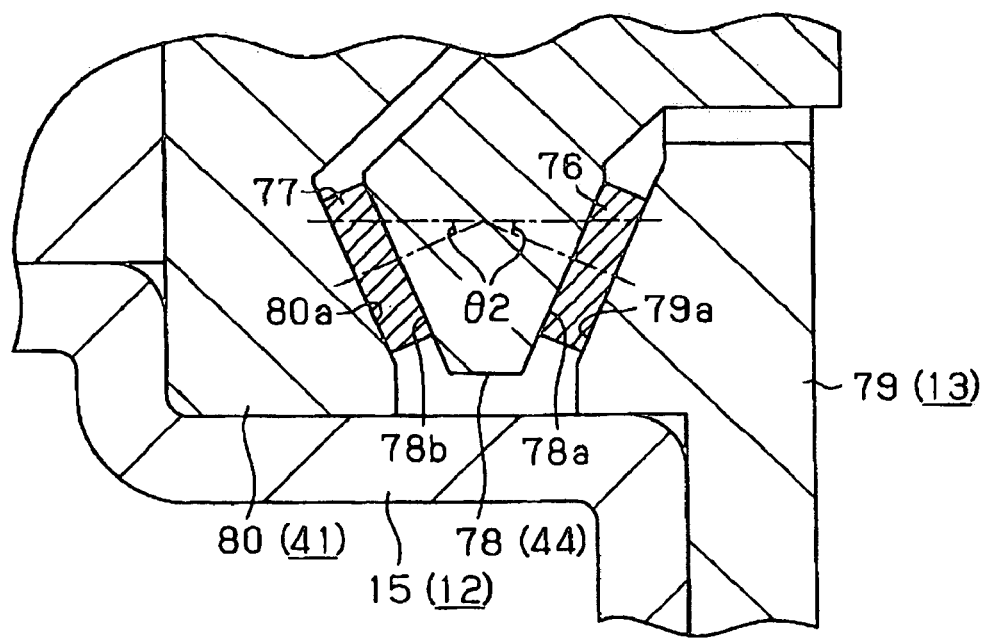
FIG. 4 is a modified example of the sliding members illustrated in FIG. 2A.

As illustrated in FIG. 4, in association with the second embodiment, a first ring 76 is positioned between one end surface of an extending portion 78 of the output shaft 44 and an inside flange 79 of the end plate 13, and a second ring 77 is positioned between the other end surface of the extending portion 78 of the output shaft 44 and a peripheral portion 80 of the internal ring gear 41. The first ring 76 can establish an angular structure at a contact angle $\theta2$ defined relative to the axial direction. Likewise, the second ring 77 can establish an angular structure at a contact angle $\theta2$ relative to the axial direction. As for both the first and second rings 76 and 77, the contact angle $\theta2$ is defined between a horizontal line and an axis of each ring. More specifically, a fixing surface 79a, which is substantially coaxial with the rotor 22, is defined in an approximately circular cone shape at the inside flange 79. A first sliding surface 78a, which is substantially coaxial with the rotor 22, is defined in an approximately circular cone shaped at the one end surface of the extending portion 78. The first sliding surface 78a is positioned so as to face the fixing surface 79a in the axial direction. A fixing surface 80a, which is substantially coaxial with the rotor 22, is defined in an approximately circular cone shape at the peripheral portion 80. A second sliding surface 78b is defined in an approximately circular cone shaped at the other end surface of the extending portion 78. The second sliding surface 78b is positioned so as to face the fixing surface 80a in the axial direction.

The first ring 76 is positioned so as to be held tight in the axial direction between the fixing surface 79a and the first sliding surface 78a. The second ring 77 is positioned so as to be held tight in the axial direction between the fixing surface 80a and the second sliding surface 78b. Each ring 76 and 77 exhibits an approximately circular cone and is positioned substantially coaxially with the rotor 22. The first ring 76 is placed at a radial distance from an axis of the output shaft 44, and the second ring 77 is placed at the same radial distance therefrom in the same radial direction. The first ring 76 is connected to or fixed to the fixing surface 79a and is rotatably in contact with the first sliding surface 78a. The second ring 77 is connected to or fixed to the fixing surface 80a and is rotatably in contact with the second sliding surface 78b. The first ring 76 possesses a contact angle $\theta2$ between the one end surface (the first sliding surface 78a) of the extending portion 78 and the inside flange 79 (the fixing surface 79a). The second ring 77 possesses a contact angle $\theta2$ between the other end surface (the second sliding surface 78b) of the extending portion 78 and the peripheral portion 80 (the fixing surface 80a). In this case, the first and second rings 76 and 77 can absorb or can be subjected with radially applied load. Therefore, it is possible to further restrain an amount of titling of the output shaft 44 relative to the radially applied load. Moreover, although the first and second rings 76 and 77 are supported so as to establish angular structures, they are held tight in the axial direction by the end plate 13 and the internal ring gear 41. Therefore, even if the first and second rings 76 and 77 are not applied with preload by a load applying means such as a wavy washer, centering of the first and second rings 76 and 77 can be achieved, and the structure thereof can be more simplified.

According to the above-described configurations, the internal ring gear 41 contributes to support the output shaft 44. In other words, the supporting member is integral with the internal ring gear 41 so as to support the output shaft 44. In such circumstances, the number of components can be reduced, which may lead to a downsizing of the motor-incorporated speed reducer. Alternatively or in addition, the output shaft 44 can be supported by a supporting member, which is, as one thinks proper, provided and secured to the casing 11. In other words, the supporting member can be separated from the internal ring gear 41.

According to the above described embodiments and modifications, the output shaft 44 is supported at a radially outside of the rotor 22 by using a space of the peripheral portion of the internal ring gear 41. Alternatively or in addition, the output shaft 44 can be supported by a space at a radially inner side of the rotor 22.

The first balls 51 can be placed at a radial position deviated from a radial position of the second balls 52. In other words, the first balls 51 do not have to be in line with the second balls 52 in the axial direction. The first balls 71 can be placed at a radial position deviated from a radial position of the second balls 72. In other words, the first balls 71 do not have to be in line with the second balls 72 in the axial direction. The first ring 64 can be placed at a radial position deviated from a radial position of the second ring 65. In other words, the first ring 64 does not have to be in line with the second ring 65 in the axial direction. The first ring 76 can be placed at a radial position deviated from a radial position of the second ring 77. In other words, the first ring 76 does not have to be in line with the second ring 77 in the axial direction.

As a rolling element of the sliding member, an approximately cylindrical or approximately circular cone-shaped roller can be employed.

The end plate 13 of the casing 11 can possess an approximately cylindrical shape with a bottom.

Electromagnets can be used in substitution for the permanent magnets 21. The electric motor can be a so-called brushless motor.

As described above, according to the embodiments and modified examples of the present invention, the output shaft 44 is rotatably supported at two portions axially distant from each other, by the first sliding members, which is held tight in the axial direction between the one end surface of the output shaft 44 and the end plate 13, and the second sliding members, which are held tight in the axial direction between the other end surface of the output shaft and the supporting member. Therefore, even when a load is applied radially to the output shaft 44, the output shaft 44, which is stably supported, can be prevented from titling. Moreover, because the first and second sliding members restrain an axial movement of the output shaft 44, for example a thrust bearing is not necessarily required additionally or separately.

Further, the first sliding member can establish an angular structure having a contact angle inclining against an axial direction between the one end surface of the output shaft 44 and the end plate 13, and the second sliding member can establish an angular structure having a contact angle inclining against an axial direction between the other end surface of the output shaft and the supporting member. Therefore, the first and second sliding member can be applied with or can absorb a radial load. Therefore, it is possible to further restrain a tilting amount of the output shaft 44 against the radial load. Moreover, although the first and second sliding members are supported so as to establish angular structures, they are held tight in the axial direction by the end plate 13 and the supporting member. Therefore, even if the first and second sliding members are not applied with preload by a load applying means such as a wavy washer, centering of the first and second sliding members can be achieved, and the structure thereof can be more simplified.

Still further, the internal ring gear 41 is employed not only as a ring gear of the external gear 47 but also as the supporting member associated with supporting the output shaft 44. Therefore, it is possible to reduce the number of components, which my leads to a downsizing of the motor-incorporated speed reducer.

Still further, by making the most use of a space of the peripheral portion 43 of the internal ring gear 41, the space which does not interfere with a gear-engaged portion between the external gear 47 and the internal ring gear 41 and a gear-engaged portion between the external gear 47 and the output shaft 44, the extending portion 45 is placed to face the peripheral portion 43 in the axial direction, and the output shaft 44 is supported by the first and second sliding members at the extending portion 45. Therefore, an axial length of the motor-incorporated speed reducer can be reduced, for example because at least one portion of the gear-engaged portions can overlap in the axial direction with the first and second balls 51 and 52.

The principles, the preferred embodiment and mode of operation of the present invention have been described in the foregoing specification. However, the invention, which is intended to be protected, is not to be construed as limited to the particular embodiment disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents that fall within the spirit and scope of the present invention as defined in the claims, be embraced thereby.

The invention claimed is:

1. A motor-incorporated hypocycloid-type speed reducer comprising:
   a casing having a case and an end plate;
   a rotor rotatably supported by the casing and actuated electrically to be rotated;
   an eccentric portion configured to rotate in response to rotation of the rotor;
   an internal ring gear fixed to the casing and including a first internal gear which is coaxial with the rotor;
   an output shaft including a second internal gear which is coaxial with the rotor;
   an external gear including a first external gear and a second external gear which are coaxial with each other, the first external gear gear-meshed with the first internal gear and the second external gear gear-meshed with the second internal gear, and the external gear rotatably supported by the eccentric portion so as to rotate in an eccentric manner;
   a supporting member secured to the casing and the output shaft interposed between the supporting member and the end plate in an axial direction;
   a first sliding member held tight in the axial direction between one end surface of the output shaft and the end plate; and
   a second sliding member held tight in the axial direction between an other end surface of the output shaft and the supporting member, wherein the output shaft is rotatably supported by the first sliding member and the second sliding member.

2. A motor-incorporated hypocycloid-type speed reducer according to claim 1, wherein the first sliding member is a rolling element and the second sliding member is a rolling element.

3. A motor-incorporated hypocycloid-type speed reducer according to claim 1, wherein the first sliding member is a ring coaxial with the rotor and the second sliding member is a ring coaxial with the rotor.

4. A motor-incorporated hypocycloid-type speed reducer according to claim 1, wherein the first sliding member possesses a contact angle defined relative to an axis thereof between the one end surface of the output shaft and the end plate, and the second sliding member possesses a contact angle defined relative to an axis thereof between the other end surface of the output shaft and the supporting member.

5. A motor-incorporated hypocycloid-type speed reducer according to claim 2, wherein the first sliding member possesses a contact angle defined relative to an axis thereof between the one end surface of the output shaft and the end plate, and the second sliding member possesses a contact angle defined relative to an axis thereof between the other end surface of the output shaft and the supporting member.

6. A motor-incorporated hypocycloid-type speed reducer according to claim 3, wherein the first sliding member possesses a contact angle defined relative to an axis thereof between the one end surface of the output shaft and the end plate, and the second sliding member possesses a contact angle defined relative to an axis thereof between the other end surface of the output shaft and the supporting member.

7. A motor-incorporated hypocycloid-type speed reducer according to claim 1, wherein the supporting member and the internal ring gear are integrated.

8. A motor-incorporated hypocycloid-type speed reducer according to claim 2, wherein the supporting member and the internal ring gear are integrated.

9. A motor-incorporated hypocycloid-type speed reducer according to claim 3, wherein the supporting member and the internal ring gear are integrated.

10. A motor-incorporated hypocycloid-type speed reducer according to claim 4, wherein the supporting member and the internal ring gear are integrated.

11. A motor-incorporated hypocycloid-type speed reducer according to claim 5, wherein the supporting member and the internal ring gear are integrated.

12. A motor-incorporated hypocycloid-type speed reducer according to claim 6, wherein the supporting member and the internal ring gear are integrated.

13. A motor-incorporated hypocycloid-type speed reducer according to claim 1, wherein the output shaft includes an extending portion which projects radially outwardly and faces a peripheral portion of the internal ring gear in the axial direction, and wherein the first sliding member is held tight in the axial direction between one end surface of the extending portion and the end plate, and the second sliding member is held tight in the axial direction between an other end surface of the extending portion and the peripheral portion of the internal ring gear.

14. A motor-incorporated hypocycloid-type speed reducer according to claim 2, wherein the output shaft includes an extending portion which projects radially outwardly and faces a peripheral portion of the internal ring gear in the axial direction, and wherein the first sliding member is held tight in the axial direction between one end surface of the extending portion and the end plate, and the second sliding member is held tight in the axial direction between an other end surface of the extending portion and the peripheral portion of the internal ring gear.

15. A motor-incorporated hypocycloid-type speed reducer according to claim 3, wherein the output shaft includes an extending portion which projects radially outwardly and faces a peripheral portion of the internal ring gear in the axial direction, and wherein the first sliding member is held tight in the axial direction between one end surface of the extending portion and the end plate), and the second sliding member is held tight in the axial direction between an other end surface of the extending portion and the peripheral portion of the internal ring gear.

16. A motor-incorporated hypocycloid-type speed reducer according to claim 4, wherein the output shaft includes an extending portion which projects radially outwardly and faces a peripheral portion of the internal ring gear in the axial direction, and wherein the first sliding member is held tight in the axial direction between one end surface of the extending portion and the end plate, and the second sliding member is held tight in the axial direction between an other end surface of the extending portion and the peripheral portion of the internal ring gear.

17. A motor-incorporated hypocycloid-type speed reducer according to claim 7, wherein the output shaft includes an extending portion which projects radially outwardly and faces a peripheral portion of the internal ring gear in the axial direction, and wherein the first sliding member is held tight in the axial direction between one end surface of the extending portion and the end plate, and the second sliding member is held tight in the axial direction between an other end surface of the extending portion and the peripheral portion of the internal ring gear.

18. A motor-incorporated hypocycloid-type speed reducer according to claim 13, wherein the output shaft includes an extending portion which projects radially outwardly and faces a peripheral portion of the internal ring gear in the axial direction, and wherein the first sliding member is held tight in the axial direction between one end surface of the extending portion and the end plate, and the second sliding member is held tight in the axial direction between an other end surface of the extending portion and the peripheral portion of the internal ring gear.

* * * * *